United States Patent [19]

McClymont

[11] Patent Number: 4,775,122

[45] Date of Patent: Oct. 4, 1988

[54] CABLE CLAMP

[75] Inventor: James D. McClymont, Greenock, Scotland

[73] Assignee: Kinloch Electronics Limited, Glasgow, Scotland

[21] Appl. No.: 146,139

[22] PCT Filed: May 8, 1987

[86] PCT No.: PCT/GB87/00312

§ 371 Date: Jan. 22, 1988

§ 102(e) Date: Jan. 22, 1988

[87] PCT Pub. No.: WO87/07443

PCT Pub. Date: Dec. 3, 1987

[30] Foreign Application Priority Data

May 23, 1986 [GB] United Kingdom ................. 8612588

[51] Int. Cl.⁴ .............................................. H02G 3/18
[52] U.S. Cl. .................... 248/74.4; 174/65 R; 439/465
[58] Field of Search .................... 248/67.5, 74.1, 74.4, 248/74.5, 230, 231.6, 316.6; 24/135 R, 135 A, 136 B, 19, 277, 282, 284, 135 K; 174/65 R; 439/449, 460, 462, 464, 465, 469, 470, 472, 468, 473

[56] References Cited

U.S. PATENT DOCUMENTS

| | | | |
|---|---|---|---|
| 1,885,228 | 11/1932 | Buchanan | 174/65 R |
| 2,445,633 | 7/1948 | Peters | 174/65 R |
| 2,457,235 | 12/1948 | Hoehn | 174/65 R |
| 2,956,103 | 10/1960 | Steel | 248/74.4 |
| 3,784,961 | 1/1974 | Gartland | 439/465 |
| 3,994,555 | 11/1976 | Konno | 439/472 |
| 4,101,729 | 7/1978 | Balchunas | 174/65 R |
| 4,153,326 | 5/1979 | Frantz | 439/465 |
| 4,195,899 | 4/1980 | Radloff | 439/468 |
| 4,229,616 | 10/1980 | Hotchkiss | 174/65 R |
| 4,389,082 | 6/1983 | Lingaraju | 439/472 |
| 4,655,422 | 4/1987 | Kelsall | 174/65 R |

FOREIGN PATENT DOCUMENTS

| | | | |
|---|---|---|---|
| 2717138 | 11/1978 | Fed. Rep. of Germany | 174/65 R |
| 2827272 | 1/1979 | Fed. Rep. of Germany | 439/465 |
| 305023 | 7/1968 | Sweden | 174/65 R |
| 721047 | 12/1954 | United Kingdom | 174/65 R |
| 729703 | 5/1955 | United Kingdom | 174/65 R |
| 889713 | 2/1962 | United Kingdom | 174/65 R |
| 908341 | 10/1962 | United Kingdom | 174/65 R |
| 1577496 | 10/1980 | United Kingdom | 439/465 |

Primary Examiner—J. Franklin Foss
Assistant Examiner—Robert A. Olson
Attorney, Agent, or Firm—Dickstein, Shapiro & Morin

[57] ABSTRACT

An electrical connector is formed with a receptacle through which the cable entry passes. A clamping block may be slidably engaged in the receptacle to engage the cable. The clamping block has end portions interlocking with the receptacle, an axial central portion, and cable-engaging portions extending oppositely from the central portion. Clamping is achieved by screws passing through slots in wings formed on the clamping portions, the screws engaging in bosses formed in the receptacle.

6 Claims, 2 Drawing Sheets

CABLE CLAMP

This invention relates to a cable clamp for use in electrical connectors. The clamp may be incorporated in a connector hood used for enclosing a multi-way connector block, such as the hood described in our British patent application No. 8611897, or may be incorporated in other forms of electrical plugs and sockets.

In the data processing field, there is a requirement for electrical connecting devices of high reliability and capable of flexible applications. Connecting cables can vary greatly in thickness, ranging from a small number of conductors up to 25-way or more. One object of the present invention is to provide a cable clamp arrangement which will effectively clamp a wide range of cable diameters. Another object is to provide a clamp which will be of assistance in achieving continuity of electrical screening where this is required.

The invention accordingly provides a cable clamping arrangement for an electrical connector device having a cable entry, the arrangement comprising a receptacle formed in the device and through which the cable entry passes, and a clamping block receivable in the receptacle to clamp a cable therebetween; the clamping block comprising spaced end portions adapted for mechanical engagement with the receptacle, an axial portion interconnecting the end portions, cable-engaging portions extending to either side of the axial portion, and means for applying force directly to said cable-engaging portions to cause them to be displaced towards each other.

Preferably, said force-applying means comprises, for each cable-engaging portion, a wing member extending therefrom and apertured to accommodate a screw-threaded fastener engageable between the cable-engaging portion and the receptacle.

Preferably, each fastener is a screw having its head bearing on the respective wing member, and threadedly engaged with a boss formed in the receptacle. Suitably, the wing member has flanges bearing on either side of the boss.

Preferably also, each end portion is a planar web transverse to the cable axis. Each web preferably has at either end a flange slidably engageable in a slot formed in the receptacle.

An embodiment of the invention will now be described, by way of example only, with reference to the drawings, in which.

Figure 1:
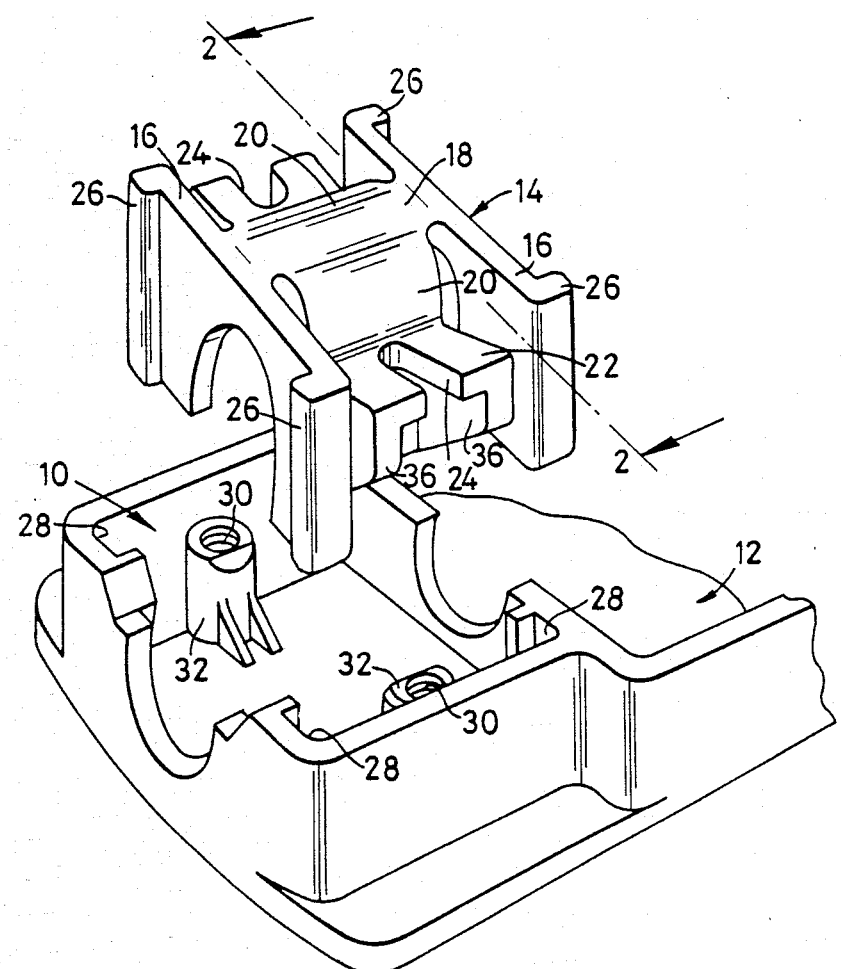
FIG. 1 is an exploded perspective view of a cable clamp arrangement embodying the invention.

The arrangement shown includes a generally rectangular receptacle 10 integrally moulded as part of a connector hood, the remainder of which is indicated at 12, and a clamping block 14. It will be understood that, in use, a cable is clamped between the receptacle 10 and the block 14, and the connector hood is closed by a mating cover (not shown).

The block 14 is an integral moulding including side webs 16 joined by a central axial portion 18. From the central portion 18 there extend curved webs 20 mounting shaped wings 22 provided with slots 24.

The side webs 16 are formed at either end with flanges 26 which slidingly engage with channels 28 formed in the corners of the receptacle 10. In this condition, the slots 24 are in register with screw-threaded bores 30 in bosses 32 upstanding from the floor of the receptacle 10. Screws 34 (FIG. 2) engaging over the wings 22 mate with the bores 30.

Figure 2:
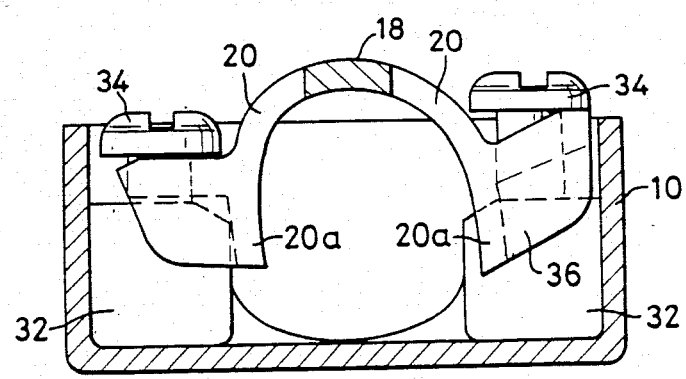
FIG. 2 is a cross-section on the line 2—2 of FIG. 1, the right-hand part showing the clamp before tightening and the left-hand part after tightening.
Figure 3:
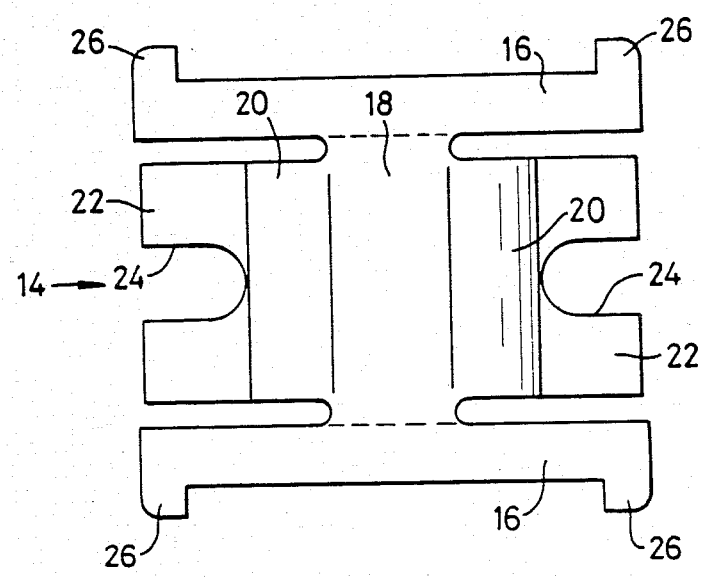
FIG. 3 is a plan view of a clamping block forming part of FIGS. 1 and 2.

As seen in the right-hand part of FIG. 2, initially the wings 22 slope upwardly away from the centre line and the lower part 20a of the web 20 is divergent. As the screws 34 are tightened down, the wings 22 are forced down and in turn deflect the lower parts 20a of the webs 20 inwardly to exert a positive grip on the cable. The wings 22 are provided with vertical flanges 36 which seat against the bosses 32, to prevent sideways distortion of the webs 20 as the screws 34 are tightened.

This arrangement provides positive clamping of cables over a wide range of cable sizes. It also avoids distortion of the receptacle 10 even at very high force levels on the screws 34.

For applications requiring RF shielding, the various mouldings are suitably metallised. The embodiment described gives good electrical continuity between the metallised mouldings; also, the rigid sides of the clamping block assist in closing the cable entry aperture to RF interference.

I claim:

1. A cable clamping arrangement for an electrical connector device having a cable entry, the arrangement comprising a receptacle formed in the device and through which the cable entry passes, and a clamping block receivable in the receptacle to clamp a cable therebetween; the clamping block comprising spaced end portions adapted for mechanical engagement with the receptacle, an axial portion interconnecting the end portions, cable-engaging portions extending to either side of the axial portion, and means for applying force directly to said cable-engaging portions to cause them to be displaced towards each other.

2. The arrangement of claim 1, in which said force-applying means comprises, for each cable-engaging portion, a wing member extending therefrom and apertured to accommodate a screw-threaded fastener engageable between the cable-engaging portion and the receptacle.

3. The arrangement of claim 2, in which each fastener is a screw having its head bearing on the respective wing member, and threadedly engaged with a boss formed in the receptacle.

4. The arrangement of claim 3, in which each wing member is formed with spaced flanges bearing on either side of said boss.

5. The arrangement of claim 1, in which each said end portion comprises a planar web transverse to the cable axis.

6. The arrangement of claim 5, in which each web is provided at either end with a flange slidably engageable in a slot formed in the receptacle.

* * * * *